United States Patent [19] [11] 4,118,777
Wallace [45] Oct. 3, 1978

[54] COMPUTER DIRECTED PRIMAL CUT INDICATING DEVICE
[75] Inventor: Charles H. Wallace, Carrollton, Va.
[73] Assignee: International Telephone and Telegraph Corporation, Nutley, N.J.
[21] Appl. No.: 714,875
[22] Filed: Aug. 16, 1976
[51] Int. Cl.² .................. A22C 17/00; G01G 19/40; G06F 15/46
[52] U.S. Cl. .................................. 364/475; 17/23; 73/432 R; 364/105
[58] Field of Search .............. 235/151, 151.1, 151.3, 235/150.1, 150; 17/1 R, 23, 45, 52, 54; 73/432 R; 99/537, 538, 646 R; 83/71, 72, 925 R, 926 R; 356/172; 250/491; 318/560, 567, 576, 577; 426/231, 518

[56] References Cited
U.S. PATENT DOCUMENTS

| 3,234,591 | 2/1966 | Vogt et al. ..................... 17/1 R X |
| 3,237,664 | 3/1966 | Macy et al. ..................... 99/538 X |
| 3,800,363 | 4/1974 | Lapeyre ............................. 17/52 |
| 3,916,484 | 11/1975 | Kennedy ............................ 17/52 |
| 3,940,830 | 3/1976 | Anderson et al. ................ 17/45 X |
| 3,940,988 | 3/1976 | Sourby ............................ 73/432 R |

Primary Examiner—Joseph F. Ruggiero
Attorney, Agent, or Firm—John T. O'Halloran

[57] ABSTRACT

Devices are described for automatically producing a reference indication of the position where a cut is to be made. Data supplied by a computer program causes a cut position indicator to give direction indications to the butcher with respect to each carcass where the cut should be made under existing market conditions for the most economical utilization of the specific carcass involved. For example in connection with a pork carcass, the computer solution for the ham cut, the data moves a device mounted directly on the saw so a beam of light or shadow is located with respect to an identifiable reference point, preferably the aitch bone. The saw will be automatically positioned in the appropriate location to produce the most economical ham/loin cut. Similarly, a light or shadow producing device, positioned over the cutting table at the area for making the shoulder cut, projects onto the carcass and is an instruction to the butcher to cut a carcass at that point, again to produce the most economical cut.

9 Claims, 7 Drawing Figures

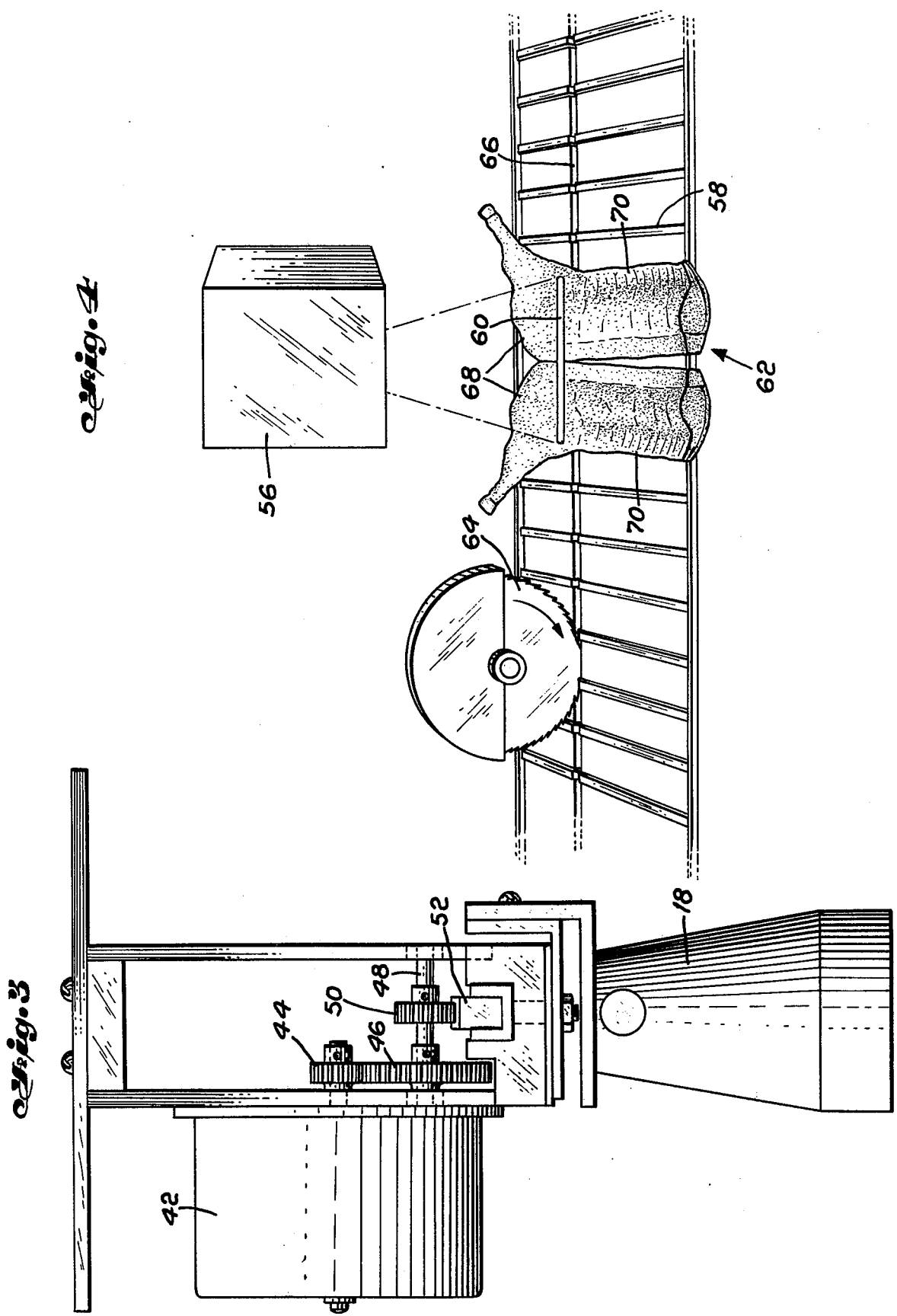

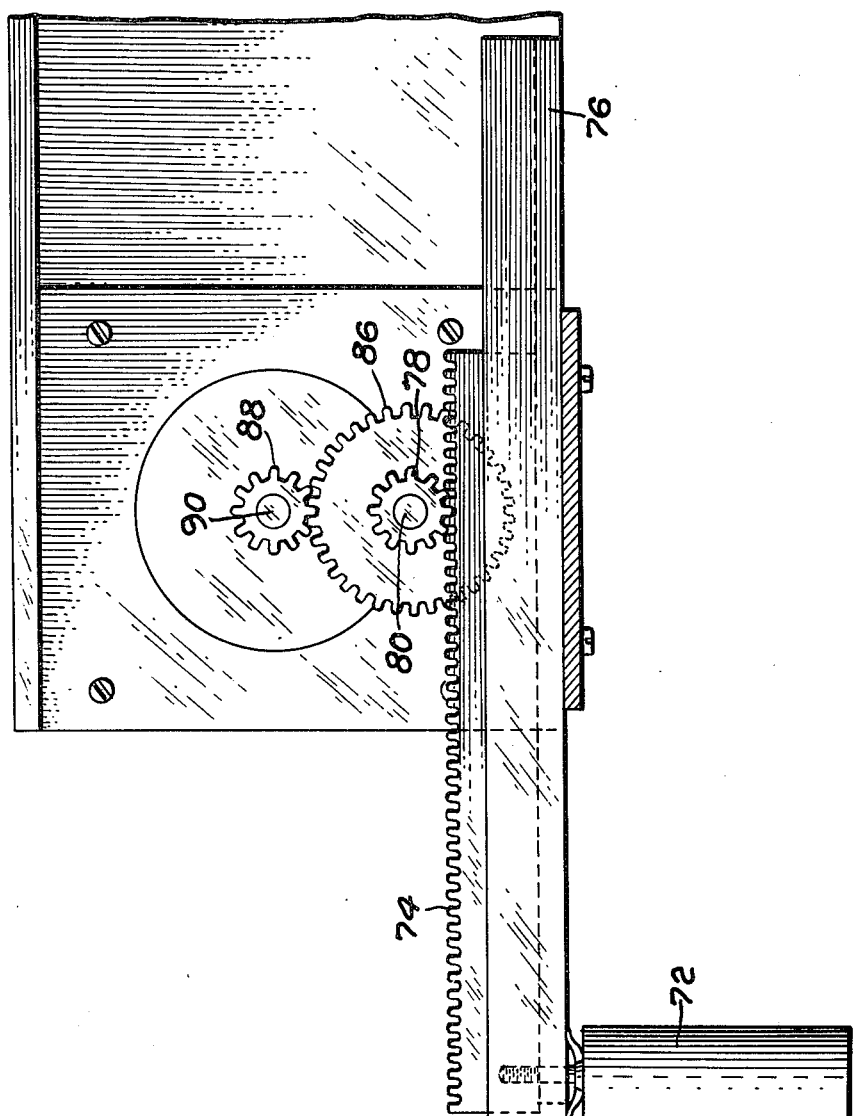
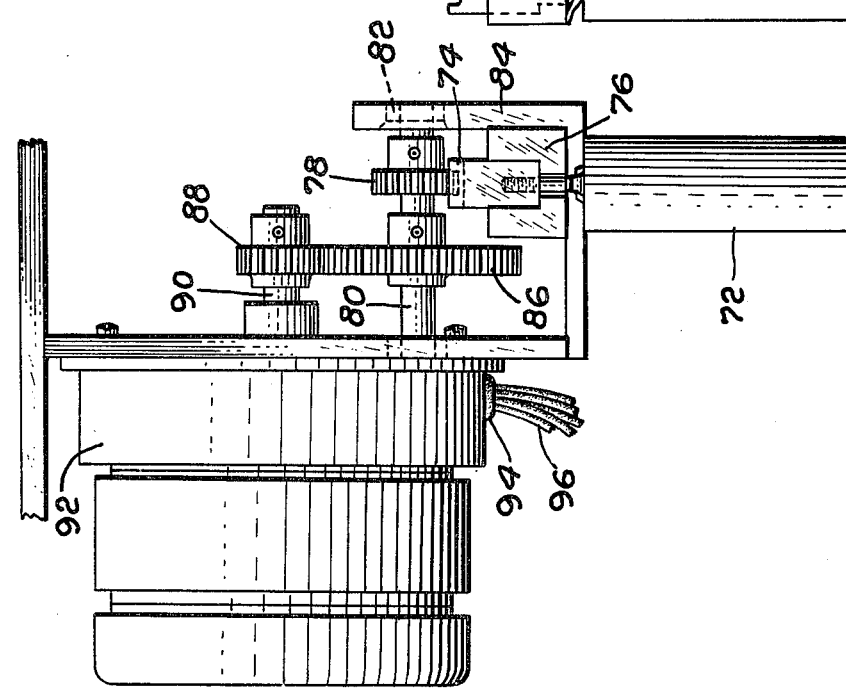

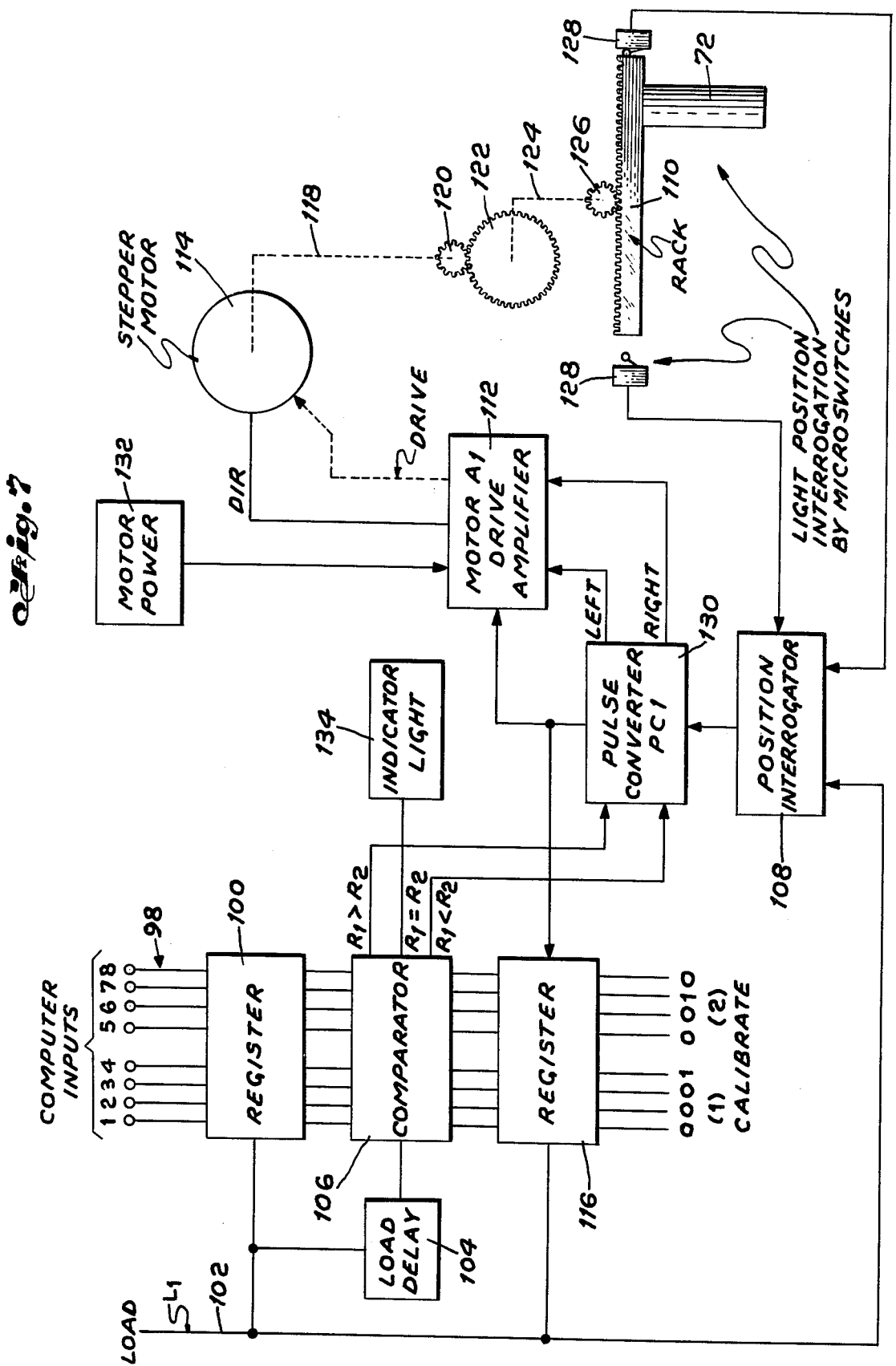

COMPUTER DIRECTED PRIMAL CUT INDICATING DEVICE

BACKGROUND OF THE INVENTION

1. Field of the Invention

Processing apparatus and methods for optimizing the value of carcass portions.

2. Prior Art

In U.S. Pat. No. 3,940,998 (assigned to the assignee of this invention), a method and means for optimizing the value obtainable from hog carcasses is disclosed, utilizing individual hog measurements and current market values to determine cutting parameters. Ham and loin primal cuts for each carcass half are optimally produced in accordance with measurements made on the individual carcass from which the cuts are obtained.

In an effort to maximize the value of hog slaughtering in a processing plant, each hog must be treated individually. The yield potentials from each hog carcass must be analyzed based on current market values, taking into account the market value of the various weight ranges of each primal cut. Also, it must be considered that the yield potential of most of the cuts is varied by the point of demarcation which still remains within the customary trade practice. Where a primal cut is going to be reduced to a boneless cut, it is frequently possible to deviate beyond normal trade practice and improve the value of the cut without any detriment to the value of the end product, either from the processing plant's, customer's or the ultimate consumer's point of view.

As described in U.S. Pat. No. 3,940,998, the value of hog cuts must be calculated daily using the current market values for each cut. Since the market value of each cut is based on the cut weight on cuts within a given weight range for the same market value on any given day, the desired weight to maximize the value of each of the primal cuts for the current market is determined by establishing the exact points of demarcation between each primal cut on each individual carcass. As described in U.S. Pat. No. 3,940,998, the consideration relates to a determination of the line of demarcation or the cutting point for the ham and loin cuts. In the apparatus and method described, the computer solution is indicated on a left side scribe readout digital display and a right side scribe readout digital display.

In practice the computer solution is displayed digitally by a series of numbers indicating to the butcher the distance from the aitch bone calculated by the computer to be the optimum under the then existing marketing conditions. A gauge like ruler has a cup-shaped member at one end and a sharp point scribe attached to a member movable along the gauge. The operator reads the value displayed and positions the scribe the distance from the cup shaped member displayed on the read out display device. By placing the cup shaped member over the aitch bone a line of demarcation between the ham and loin is cut into the carcass which then acts as the instruction to the butcher to make the cut at the line so scribed.

In practicing the teachings of U.S. Pat. No. 3,940,998, it has been determined that more accurate cutting can be obtained if, instead of scribing a mark on the carcass, the computer's solution to making the cut as between the ham/loin and shoulder/loin is indicated by either the position of a light line or a shadow.

SUMMARY OF THE INVENTION

For purposes of ready understanding of the subject matter of this patent this specification describes the various operations in connection with cutting up a pork carcass. It will be understood, however, that the basic types of cut position indicating devices are applicable to any meat carcass such as beef, lamb, veal and the like. Three different types of cut position indicating devices are described. One is broadly applicable to any portable saw and is illustrated here by a portable ham/loin saw for pork carcasses. The second general type cut position indicating device is broadly applicable to cutting tables where a fixed position circular saw or band saw is employed to make the cuts. The third type of cut instructing device comprises two or more colored lights which provide instructions to a butcher and the example employed herein is a computer directed instruction to leave the blade in or to remove the blade from a loin. It will be appreciated that with these three types of cut instructing devices virtually any of the ordinary cuts of meat from almost any type of meat animal can be determined so that optimization of the value of each individual carcass into the highest value cuts can be achieved.

As described in the above-mentioned patent, it is possible to analyze each carcass through the use of a computer and thereby obtain a maximum dollar producing cutoff point for each cut of meat from each individual carcass. The device of this invention may take three different forms. One form is to transmit the cutoff data to a device mounted directly on the saw utilized to make the ham/loin cut or alternatively, to create a light or shadow line on the carcass at the point in the process where the shoulder/loin cut is to be made. Additionally, the computer can determine for each individual carcass whether the loin should be sold blade in or blade out and an additional indicating light can be displayed to the butcher which will instruct him to remove the blade or leave it in the loin that is produced from each side of the carcass.

Preferably, a conventional ham saw has a movable light source mounted on it. The light source casts a light line or shadow on the reference point, i.e., the aitch bone. Since the light source is movable relative to the saw blade, if the operator positions the light line or shadow on the aitch bone, the saw blade will be spaced from that light line by an amount dictated by the computer program for that specific carcass, to maximize the value for that particular carcass side for the ham/loin cut.

Similarly, a movable light line creating source or a shadow producing source is positioned over the cutting table at the location where the shoulder/loin cut is made and, again directed by the computer instructions, the position of the light line or shadow on the carcass side will dictate where the butcher makes the cut to maximize the value of the shoulder/loin cut for each individual carcass side.

A further output from the computer is to a pair of lights, which may be red and green, for example, which will indicate to the butcher that each loin product has its optimum value by a determination by the computer program that the blade should be left in or removed.

DESCRIPTION OF THE DRAWINGS

FIG. 3 is an end view and partial cross-section illustrating the mechanical arrangement of the parts of the drive mechanism for positioning the light source of the device illustrated in FIG. 1;

FIG. 4 is a schematic illustrating the positioning of the light source relative to a carcass conveyor positioned relative to the shoulder/loin cutter;

FIG. 5 is a front elevation of the light source positioning apparatus illustrated in FIG. 4;

FIG. 6 is an end view of the device illustrated in FIG. 5; and

FIG. 7 is a functional block diagram of an apparatus suitable for positioning the light or shadow producing source to indicate cutting position.

DESCRIPTION OF THE PREFERRED EMBODIMENTS

Figure 1:
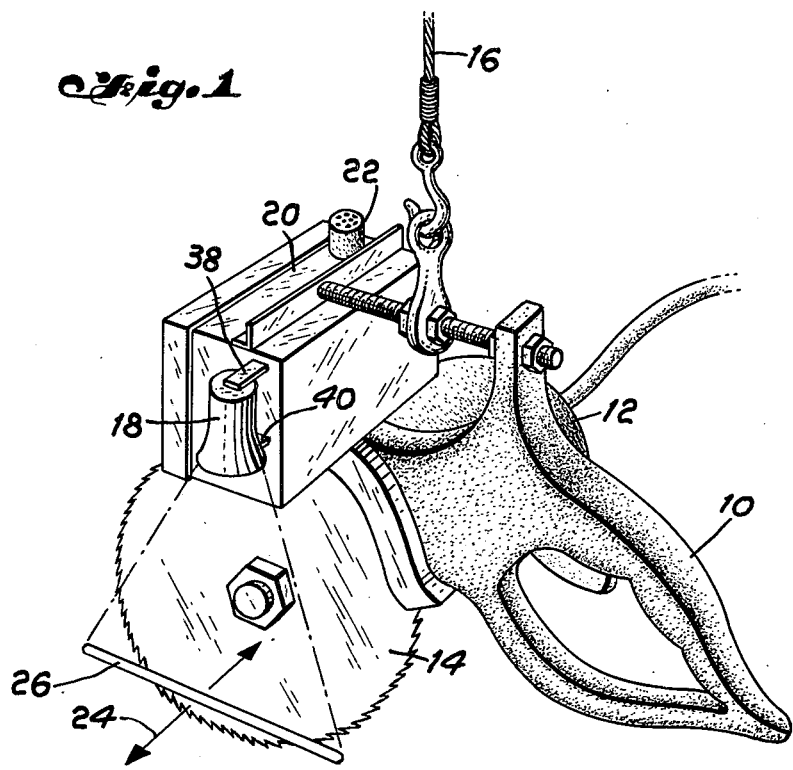
FIG. 1 is a schematic perspective of the device of this invention utilized in connection with making the ham/shoulder cut.

Referring to FIG. 1, a conventional ham saw 10 is provided with the usual drive motor 12 which drives the cutting blade 14. As is conventional practice, the device 10 is supported by a cable or chain 16 which is attached to a counter-balance (not shown). A light source 18 is carried by a housing 20 which is mounted on the ham saw 10 as illustrated in FIG. 1. An electrical connection 22 provides the electrical input to control positioning motor, as will be described in detail below, as well as provides electrical power to the light source 18. A light source 18 is positioned so that it moves in the direction of the arrows 24 relative to the blade 14 so that the light line 26 (which may be a shadow rather than a light line) is movable relative to the fixed position of the saw blade 14.

As will be described in detail below, the relative position of the light line 26 with respect to the saw blade 14 is determined for each carcass side by the computer program and the method described in U.S. Pat. No. 3,940,998.

Figure 2:
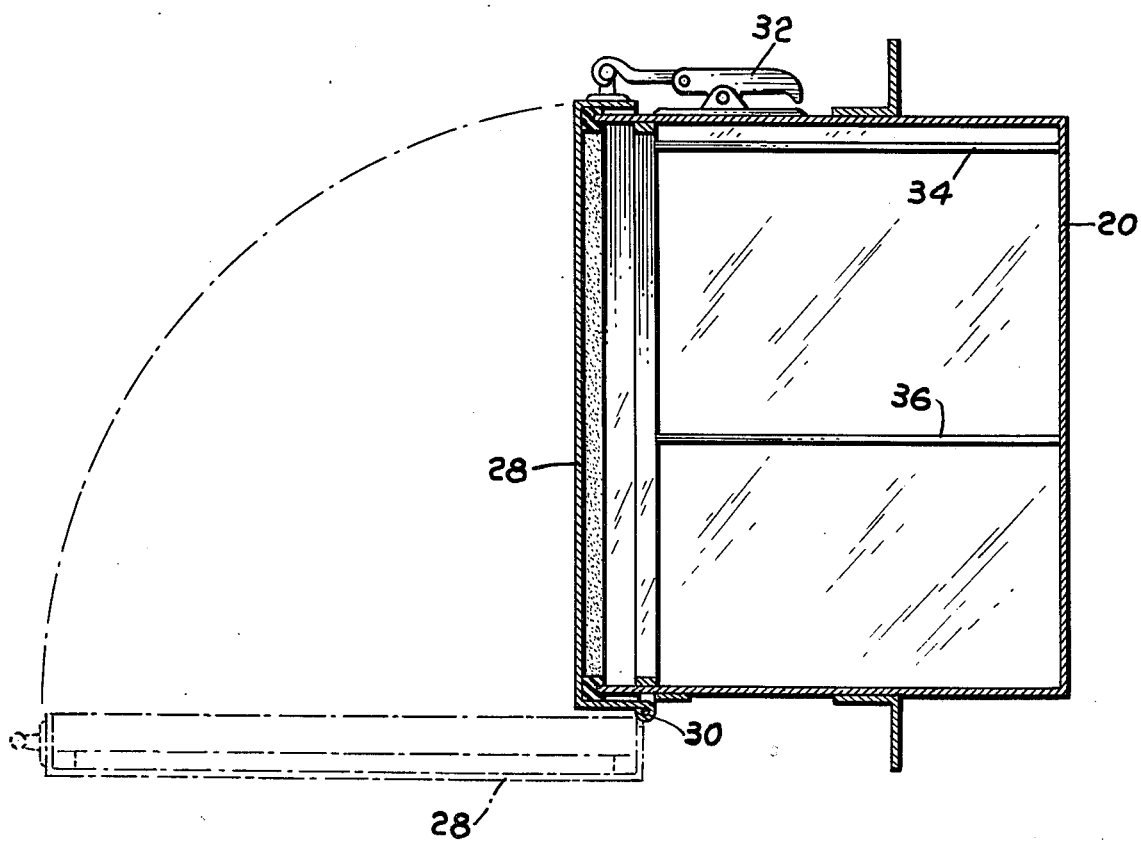
FIG. 2 is a cross-sectional elevation view of the housing for the device of this invention as illustrated in FIG. 1.

The housing 20 as illustrated in FIG. 2 has an access door 28 which is hinged at 30 permitting access to the interior of housing 20. A clasp 32 holds the access door in position so that the interior of the housing 20 is sealed during normal operations. The light source 18 is supported in the housing on an upper slide guide 34 and a lower slide guide 36.

As illustrated in FIG. 3, the slides 38, 40 are movable relative to housing 20. A motor 42 drives gear 44 which, in turn, rotates gear 46 attached to shaft 48 which causes the rotation of gear 50 and hence causes the transverse movement of rack 52.

As will be described below in detail in connection with FIG. 7, the positioning of the rack 52 and hence the light source 18 is controlled by the commands received from the computer in accordance with the teachings of U.S. Pat. No. 3,940,998.

Referring to FIG. 4, it will be seen that a housing 56 which may be of the same form illustrated in FIG. 3 or as described below in connection with FIGS. 5 and 6, is positioned above the carcass side conveyor 58 so as to cast a light line or a shadow 60 on a carcass 62. A fixed position cutter blade 64 which is conventional is positioned so that its lower end extends into a slot 66 in the conveyor 58. The position of the light line 60 or shadow on the carcass is produced by the position of the light source 18 relative to the position of the cutter blade 64. By lining up the position of light or shadow 60 of the carcass with the slot 66, the cutter blade 64 will sever the shoulder portion 68 of the carcass from the loin portions 70.

Referring to FIGS. 5 and 6, a line or shadow producing source 72 is attached to a rack 74 which is movably carried in a supporting element 76. A gear 78 attached to shaft 80 journaled in bearing 82 carried by the support structure 84 is rotated by a gear 86 which, in turn, is driven by gear 88 attached to shaft 90 which is driven by motor 92. The device as illustrated in FIGS. 5 and 6 is suspended over the conveyor 58 as illustrated schematically in FIG. 4. Positioning commands from the computer and electrical power for the line or shadow source 72 is provided by electrical connections 94 through electrical lines 96.

One means of providing for the positioning of a line source 18, 72 is illustrated in FIG. 7. There are eight input lines 98 to register 100. Input lines 1 through 4 of input lines 98 are loaded with the most significant number and input lines 5 through 8 of input lines 98 are loaded with the least significant number. A load line 102 receives a command from the computer (not shown) ordering the system to accept numbers transmitted to the positioner by the computer (not shown).

After the numbers are inserted in register 100, the load command is delayed by load delay device 104 which is connected to register 100 and to comparator 106. Instead, a load command from the computer (not shown) is fed to an interrogation circuit in position interrogator 108, which, because of its inputs, determines where the light source positioner 110 actually is. The load command commands the stepping motor amplifier 112 to cause the stepped motor 14 to move the positioner 110 to a home position. In the system illustrated, the home position is set at the 1.2 inch mark. The delay time in the load access to the comparator 106 is preferably approximately ⅓ of the total repositioning time. This is to allow for the positioner 110 to get to a calibrate position from its most extreme point. After the delay time, the load pulse on line 102 is fed to the computer where it is permanently stored in register 116. Simultaneously, the number 1.2 is fed into comparator 106 and any number fed into the comparator 106 from register 100 is compared to it. The comparator now generates "less than", "more than", or "equal to" commands which are converted to a finite number of pulses which correspond to the computed error, preferably at a rate of 9 pulses per 10th of an inch for the specific system illustrated. The motor 114 responds to the individual pulses and simultaneously, the same pulses change the pulses stored in counter register 116 until the comparator 106 inputs from register 100 and register 116 are equal. At this time, the motor 114 stops and the light source 72 is at a new position as dictated by the computer command to optimize the cut involved.

The stepper motor 114 operates a shaft 118 which, in turn, operated gear 120 which drives gear 122, rotating shaft 124, and the pinion gear 126 to move the rack 110 to which the light source 72 is attached. A pair of microswitches 128 provide rack 110 position indicating signals to the position interrogator 108. The "less than", "more than" or "equal to" commands from comparator 106 are put into pulse converter 130 along with a signal from the position interrogator 108. Pulse converter 130 has an output to the motor drive amplifier 112f or stepper motor 114 and generates a "left movement" command or a "right movement" command as well as the error pulses which are simultaneously fed by the pulse converter 130 to the motor drive amplifier 112 and counter register 116.

Electrical power for the stepper motor is provided by a motor power device 132. An indicator light 134 provides a visual indication to the cutter that the system is positioning the light source or that the light source 72 is in the proper position.

While the device of this invention has been described in connection with the above embodiments for making a ham/loin cut and a shoulder/loin cut, it will be appreciated that the same principles are involved in generating a command to a light indicator which will give a visual indication to the butcher with respect to each carcass side as to whether the loin product should be left blade in or the blade removed.

With the above description of the three types of devices, it will be appreciated by those of skill in the art that computer directed cutting instructions can be provided for cutting up any meat carcass. Any portable meat saw could have the attachment illustrated in the Figures, specifically FIGS. 1 through 3 and could be adapted to provide the cutting instruction for such a saw. Similarly, the device illustrated in FIGS. 4 and 5 could be utilized where a fixed position circular saw or band saw is employed in making the cut. Thirdly, for other types of cuts involving an analogous instruction to the blade in blade out instruction could also be adapted for cuts other than loin cut of a pork carcass.

It will be appreciated by those skilled in the art that various modifications may be made to the device as illustrated and described without departing from the scope of the appended claims.

I claim:

1. Cut position reference indicating means for directing the cutting of primal cuts from carcasses, comprising:
    cutting means;
    line creating means;
    means for positioning said line creating means relative to said cutting means; and
    computer directed control means for operating said positioning means to indicate the relative spacing between said cutting means and said line creating means so as to optimize the value of the cuts being formed from said carcass.

2. The device of claim 1, wherein said line creating means is a light source which projects a reference light line onto said carcass.

3. The device of claim 1, wherein said line creating means is a shadow line producing device projecting a shadow line reference onto said carcass.

4. A device for generating a cut position instruction for each individual side of a carcass to optimize the value of cuts made therefrom, comprising:
    a device for computing the optimum position of the cut from a plurality of individual measurements of said carcass, relative to a reference point on said carcass;
    a cutting device for making said cut;
    a light line producing source movable relative to said cutting device; and
    means directed by said computer for adjusting the position of said light line relative to said cutting device whereby when said light line is positioned on said reference point, said cutting device is positioned so as to optimize said cuts.

5. A device for generating a cut position instruction for each individual side of a carcass to optimize the value of the cuts made therefrom, comprising:
    a device for computing the optimum position of the cut from a plurality of individual measurements of said carcass relative to a reference point on said carcass;
    a cutting device for making said cut;
    a shadow line creating means movable relative to said cutting device; and
    means directed by said computer for adjusting the position of said shadow line creating means relative to said cutting device whereby when the shadow produced by said shadow producing means is positioned on said reference point, said cutting device is positioned relative thereto so as to optimize said cuts.

6. The device of claim 4, wherein said cutting device is a ham saw and said light line producing source is attached thereto including a movable element carrying said light line producing source.

7. The device of claim 5, wherein said shadow line producing means is positioned in a housing carried by a conventional ham saw.

8. A device for generating a cut position instruction for each individual side of a carcass to optimize the value of the loin and shoulder cuts, comprising:
    a device for computing the optimum position of the loin/shoulder cut from a plurality of individual measurements of said carcass relative to a reference point on said carcass;
    a fixed positioned cutting device for making said cut;
    a cutting table for supporting said cut including a grooved portion for accommodating the lower end of said cutting device;
    a light line producing means positioned above said cutting table means for producing a light line on said carcass whose position is movable relative to said groove; and
    means directed by said computer for adjusting said position for said light line relative to said cutting device.

9. A device for generating a cut position instruction for each individual side of a carcass to optimize the value of the loin and shoulder cuts, comprising:
    a device for computing the optimum position of the loin/shoulder cut from a plurality of individual measurements of said carcass relative to a reference point on said carcass;
    a fixed positioned cutting device for making said cut;
    a cutting table for supporting said cut including a groove portion for accommodating the lower end of said cutting device;
    a shadow line producing means positioned above said cutting table means for producing a shadow line on said carcass whose position is movable relative to said groove; and
    means directed by said computer for adjusting said position for said shadow line relative to said cutting device.

* * * * *